United States Patent [19]

Mutzenberg et al.

[11] 4,250,172

[45] Feb. 10, 1981

[54] NEEDLED FIBER MAT CONTAINING GRANULAR AGENT

[76] Inventors: Arnold B. Mutzenberg, Birkenaustrasse 24, CH-9470 Buchs, SG; Hans P. Hausheer, Im Jörlisbühl, CH-9475 Sevelen, SG, both of Switzerland

[21] Appl. No.: 10,865

[22] Filed: Feb. 9, 1979

[51] Int. Cl.$^3$ .............................................. B32B 5/16
[52] U.S. Cl. .................................. 428/234; 428/244; 428/283; 428/284; 428/285; 428/286; 428/287; 428/300
[58] Field of Search ............... 428/234, 244, 283, 300, 428/284–287; 55/522, 525, 527; 210/500 R,

[30] Foreign Application Priority Data

Feb. 2, 1978 [CH] Switzerland ................. 168781/78

[56] References Cited

U.S. PATENT DOCUMENTS 3,871,850   3/1975   Lenane ................................. 428/300

FOREIGN PATENT DOCUMENTS 1245965   7/1971   United Kingdom ..................... 428/283

Primary Examiner—Marion McCamish
Attorney, Agent, or Firm—Griffin, Branigan & Butler

[57] ABSTRACT

At least two layers of fibrous mat have a layer of granular agent therebetween and are mechanically interlocked by means of needling.

20 Claims, 2 Drawing Figures

NEEDLED FIBER MAT CONTAINING GRANULAR AGENT

BACKGROUND OF THE INVENTION

It is well known in the processing industries to treat liquid and gaseous substances by contacting them with solids such as granular agents. Such processes are often called "sorption" processes and are usually performed in beds which include a tank or vessel with a supporting grid or screen onto which a layer of granular agent is evenly distributed and through which layer the liquid or gaseous substance flows and is subjected to the sorption treatment. In this respect, the screen has a mesh size small enough to avoid entrainment of the granular agent.

Inherent disadvantages of the above-described beds are that they require renewal of the granular agent after exhaustion of its activity; and, this, in turn, requires a means to drain the granular agent and a means to refill the bed with fresh agent. Additionally, the layer of granular agent has to be of an even thickness to obtain a constant contact-time of the liquid or gaseous substance as it flows in a perpendicular direction through the whole layer-area of the granular agent.

Other known contact assemblies for sorption processes include those where a granular agent is located between two screens which are arranged such that the granular layer can be oriented in any desired angle such as vertically, for example. In this manner, with a vertically oriented layer, the direction of flow of the liquid or gaseous substance can be horizontal. An assembly of this type, however, has the disadvantage that, during its use, the granular agent tends to settle thereby leaving a space for a reduced-density portion at the upper edge of the layer. In such event, portions of the liquid or gaseous substance can flow through the assembly while having little or no contact with the granular agent. Some of the substance, therefore, remains untreated or poorly treated because of the reduced contact-time with the granular sorption agent. This disadvantage has been overcome in the past by using flexible, but tight, membranes pressed onto the upper edges of the assembly by springs or the like, but these are costly and not always desirable.

Fibrous mats have also been used to support granular agents. Such mats, however, have been impregnated with a powdered agent that is retained by means of a sticky or gluey coating applied to the fibers. This has the serious disadvantage of reducing the contact-area of the agent wherever the agent is covered by the sticky or gluey coating.

It is an object of this invention, therefore, to provide a mechanically stable mat containing at least one layer of granular sorption agent which is easily replaced; and, wherein a liquid or gaseous substance flowing across the granular agent is subjected to a uniform contact-time with the granular agent.

SUMMARY

According to principles of this invention at least one layer of granular sorption agent is located between at least two layers of fibrous mat which are mechanically interlocked by means of needling. In this manner, the liquid or gaseous substance that is flowed or trickled through the mat is brought into uniform contact with the granular sorption agent for deodorization, decolorization, or the like by the granular agent.

BRIEF DESCRIPTION OF THE DRAWINGS

The foregoing and other objects, features, and advantages of the invention will be apparent from the following more particular description of preferred embodiments of the invention as illustrated in the accompanying drawings. The drawings are not necessarily to scale, emphasis instead being placed upon illustrating principles of the invention in a clear manner.

DESCRIPTION OF PREFERRED EMBODIMENTS

Figure 1:
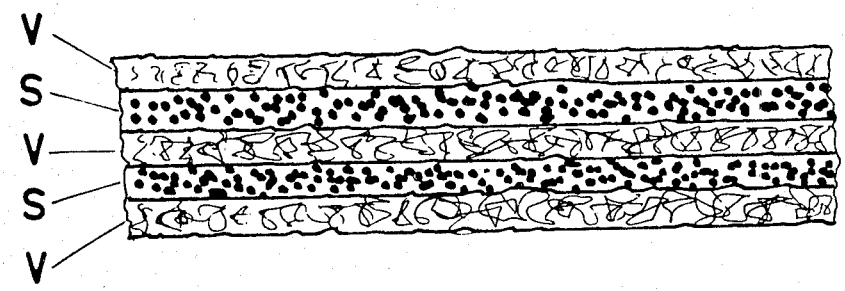
FIG. 1 is a sectional view of a textile fiber mat with a layer of granular sorption agent therein.

The mat in accordance with FIG. 1 comprises three layers of textile fibers V and sandwiched inbetween are two layers of granular agent such as activated carbon. Ionized molecules can also be removed from aqueous solutions when the granular agent is an ion exchange resin. The layers V are preferably of textile fibers, part of which are unwoven, so that some of the fibers can be transported by needling through the layers S of granular agent and be interlocked to the other layers V. That is, fibers from the upper layer V are interlocked by the penetrating needles with those of the intermediate and lower layers V at the opposite side of the mat.

Figure 2:
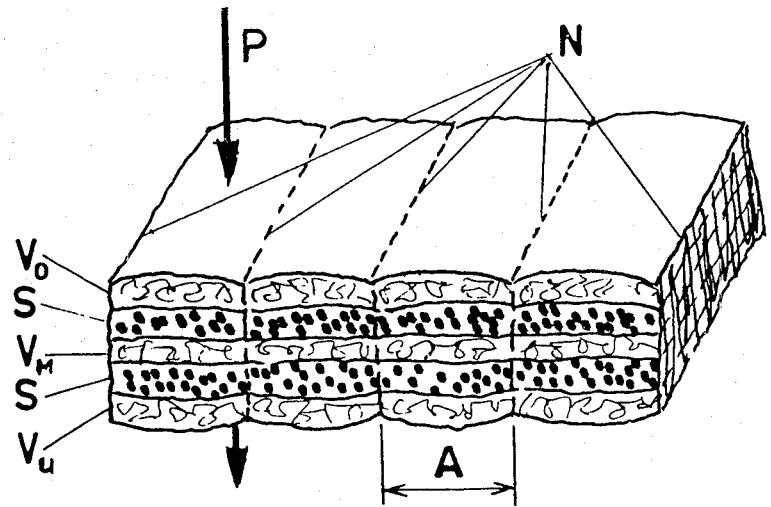
FIG. 2 is a perspective view of the mat of FIG. 1 and further illustrates rows of needling for holding the mats together.

FIG. 2 shows the resulting assembly after being stitched by needling. The needling operation is performed such that seams N are in parallel rows at the distance A between the rows. In this respect, the rows N are preferably between about 5 and 20 mm apart.

When the direction of the needles penetrates the mat in the direction indicated by arrow "P", the needles transport fibers from the layer $V_o$ to the layer in the middle $V_m$ and further to the bottom layer $V_u$. This mechanical interlocking or intertwinement of the fibers from the various layers constitutes a mechanical link between all layers which results in a mechanically stable mat. The fibers linking the various layers are shown on the right cross-sectional portion of FIG. 2 and are the same along the length of each row, where the needling N has been performed.

The layers V in the illustrated examples are indicated as being non-woven fleece pads. The invention is not limited to non-woven fleece pads, however, as long as enough fiber emitting and fiber interlocking material is provided to result in the mechanically stable mat described above. Specifically it is possible to add to one or more of the layers such as $V_M$ in FIG. 2, for example, a layer of a woven fabric or "scrim", which yields a higher tear-strength than if all non-wovens are used.

Similarly, the invention is not limited to the use of fibers made of synthetic materials or natural fibers such as wool or cotton. The fibers can be made of metals. Stainless steel, for example, can be used for applications where textile fibers will not stand elevated temperature and/or the chemical activity of the liquid or gaseous substance that is passed through the mat.

It has been found that it is very easy to handle or replace the mats of the present invention. A further advantage of the present invention is that the structure performs a combination of both filtration and sorption functions. The layer $V_o$ in FIG. 2, for example, functions as a mechanical filter to solids or sticky contaminants which might be carried by the stream P of liquid or gaseous substance. Moreover, this filtration function prior to the contact with the granular agent prevents the agent's granules from becoming clogged or contaminated and from having its active surface coated with unactive material. According to this aspect of the invention, the initial layer $V_o$ can be of a selected porosity and have other selected filtration characteristics in accordance with the material it is to filter.

A further advantage of the above-described invention is that the layer $V_u$ also acts as a mechanical filter for the liquid or gaseous substance after it has passed through the layer or layers of granular agent. This filtering layer $V_u$, therefore, prevents solids from being carried away by the gaseous substance itself. Again, this layer can be selected to obtain the desired porosity and filtration characteristics.

Still other advantages of the invention are that the thusly structured mats have been found to be easily formed into bags, sleeves, or inserts by cutting and sewing or ultrasonic welding or by using adhesives and tapes.

What is claimed is:

1. A mat containing a granular agent for treatment of a liquid or gaseous stream flowing through said mat and thereby coming in contact with the granular agent, said mat comprising:

at least two layers of fibrous material;
   at least one layer of granular agent located between said layers of fibrous material; and,
   wherein said layers of fibrous material are mechanically linked together by needling.

2. The mat of claim 1 wherein two or more layers of granular agent are placed between layers of fibrous material, which are linked together by needling.

3. The mat of claim 2 wherein at least one layer of said fibrous material is reinforced by a scrim.

4. The mat of claim 3 wherein the distance between needled rows is between about 5 and 20 mm.

5. The mat of claim 4 wherein the fibrous material includes natural textile fibers.

6. The mat of claim 4 wherein the fibrous material includes synthetic textile fibers.

7. The mat of claim 4 wherein said fibrous material includes metallic fibers.

8. The mat of claim 1 wherein at least one layer of said fibrous material is reinforced by a scrim.

9. The mat of claim 8 wherein the distance between needled rows is between about 5 and 20 mm.

10. The mat of claim 9 wherein the fibrous material includes natural textile fibers.

11. The mat of claim 9 wherein the fibrous material includes synthetic textile fibers.

12. The mat of claim 9 wherein the fibrous material includes metallic fibers.

13. The mat of claim 1 wherein the distance between needled rows is between about 5 and 20 mm.

14. The mat of claim 13 wherein the fibrous material includes natural textile fibers.

15. The mat of claim 13 wherein the fibrous material includes synthetic textile fibers.

16. The mat of claim 13 wherein the fibrous material includes metallic fibers.

17. The mat of claim 1 wherein the fibrous material includes natural textile fibers.

18. The mat of claim 1 wherein the fibrous material includes synthetic textile fibers.

19. The mat of claim 1 wherein the fibrous material includes metallic fibers.

20. The mat of claim 1 wherein the characteristics of said fibers are selected to provide a porosity in accordance with the liquid or gaseous substance to be passed through said mat.

* * * * *